United States Patent
Creyghton et al.

(10) Patent No.: US 7,611,689 B2
(45) Date of Patent: Nov. 3, 2009

(54) FAUJASITE ZEOLITE, ITS PREPARATION AND USE IN HYDROCRACKING

(75) Inventors: Edward Julius Creyghton, Amsterdam (NL); Laurent Georges Huve, Amsterdam (NL); Aan Hendrik Klazinga, The Hauge (NL)

(73) Assignee: Shell Oil Company, Houston, TX (US)

( * ) Notice: Subject to any disclaimer, the term of this patent is extended or adjusted under 35 U.S.C. 154(b) by 507 days.

(21) Appl. No.: 11/232,060

(22) Filed: Sep. 21, 2005

(65) Prior Publication Data

US 2006/0073963 A1 Apr. 6, 2006

Related U.S. Application Data

(60) Provisional application No. 60/612,690, filed on Sep. 24, 2004.

(51) Int. Cl.
*C01B 39/20* (2006.01)
(52) U.S. Cl. .............. 423/700; 502/64; 502/66; 502/74; 502/79
(58) Field of Classification Search .......... 423/700; 502/64, 66, 74, 79
See application file for complete search history.

(56) References Cited

U.S. PATENT DOCUMENTS

| | | | | |
|---|---|---|---|---|
| 3,130,007 | A | 4/1964 | Breck | 23/113 |
| 3,449,070 | A * | 6/1969 | Maher et al. | 423/713 |
| 4,085,069 | A | 4/1978 | Alafandi et al. | 252/455 |
| 4,401,556 | A | 8/1983 | Bezman et al. | 208/111 |
| 4,925,546 | A | 5/1990 | Kukes et al. | 208/111 |
| 5,435,987 | A | 7/1995 | Cooper | 423/700 |
| 5,620,590 | A | 4/1997 | Absil et al. | 208/111 |
| 5,954,947 | A | 9/1999 | Mignard et al. | 208/111.03 |
| 6,043,178 | A | 3/2000 | Ge et al. | 502/64 |
| 6,045,687 | A | 4/2000 | Mignard et al. | 208/111.3 |
| 6,093,672 | A | 7/2000 | Winquist et al. | 502/64 |
| 6,136,291 | A | 10/2000 | Chester et al. | 423/713 |
| 6,174,429 | B1 | 1/2001 | Geroge-Marchal et al. | 208/111.01 |
| 6,174,430 | B1 * | 1/2001 | Winquist et al. | 208/111.35 |
| 6,852,214 | B1 * | 2/2005 | Chester et al. | 208/113 |
| 7,192,900 | B2 * | 3/2007 | Creyghton et al. | 502/79 |
| 7,476,638 | B2 * | 1/2009 | Chester et al. | 502/64 |
| 2002/0037805 | A1 * | 3/2002 | Timken et al. | 502/79 |
| 2002/0094931 | A1 | 7/2002 | Wang et al. | 502/63 |
| 2004/0141911 | A1 * | 7/2004 | Cooper et al. | 423/713 |

FOREIGN PATENT DOCUMENTS

| | | |
|---|---|---|
| EP | 310164 | 4/1989 |
| EP | 310165 | 4/1989 |
| EP | 428224 | 5/1991 |
| WO | 95/03248 | 2/1995 |
| WO | 99/325582 | 7/1999 |
| WO | WO2004/047988 | 6/2004 |
| WO | WO2004/050548 | 6/2004 |

OTHER PUBLICATIONS

"Introduction to Zeolite Science and Practice" Chapter 15—Hydrocarbon Processing with Zeolite pp. 602-603 edited by Van Bekkum. Flanigen. Jansen; published by Elsevier. 1991.

* cited by examiner

*Primary Examiner*—David M Brunsman
(74) *Attorney, Agent, or Firm*—Charles W. Stewart

(57) ABSTRACT

The invention provides a zeolite of the faujasite structure which has a unit cell size in the range of from 24.40 to 24.50 Å; a bulk silica to alumina ratio (SAR) in the range of from 5 to 10; and an alkali metal content of less than 0.15 wt %. Such zeolites have been found to have a very useful naphtha selectivity in hydrocracking, particularly a selectivity to heavy naphtha. A preparation process for the zeolite, hydrocracking catalyst composition comprising the zeolite and its use in hydrocracking are also provided.

21 Claims, No Drawings

FAUJASITE ZEOLITE, ITS PREPARATION AND USE IN HYDROCRACKING

This application claims the benefit of U.S. Provisional Application Ser. No. 60/612,690, filed Sep. 24, 2004.

FIELD OF THE INVENTION

The present invention relates to faujasite zeolites having application in hydrocracking catalyst compositions, their preparation and use.

BACKGROUND OF THE INVENTION

Hydroconversion processes are important in the modern world in providing important basic fuels for everyday life. As it becomes of an increasing necessity to utilize heavier crude oil feedstocks, the oil refining industry has turned to hydrocracking processes to provide the lighter basic fuels which modern society demands. While amorphous hydrocracking catalysts are used, modern hydrocracking catalysts are often based on zeolitic materials.

Faujasite materials are one of the main zeolitic materials proposed for hydrocracking use. Early findings showed that modification of the basic materials described in U.S. Pat. No. 3,130,007 to produce a lowering of the unit cell size, gave improved selectivity to the desired middle distillate, or mid-barrel, products. To achieve this, various combinations of steam calcination and dealumination, usually acid-dealumination, techniques have been proposed.

However in certain regions, eg North America, middle distillate products are not the most desired aim of hydrocracking, instead the lighter liquid products boiling below 191° C. are more in demand. Such products are called the naphtha fractions, with heavy naphtha (the fraction boiling from 82° C. to 191° C.) being in particular more desirable. Faujasites having a unit cell size of 24.40 Å or more are known to be more naphtha-selective than those with a lower unit cell size (which are more commonly used in middle distillate-selective catalysts). For faujasites with unit cell size above 24.40 Å, it is found that the higher unit cell size, the higher the selectivity to naphtha, and to heavy naphtha in particular.

SUMMARY OF THE INVENTION

The present invention provides a zeolite of the faujasite structure which has a unit cell size in the range of from 24.40 to 24.50Å; a bulk silica to alumina ratio (SAR) in the range of from 5 to 10; and an alkali metal content of less than 0.15 wt %.

When in hydrocracking use, said lower unit cell size zeolites generate a heavy naphtha selectivity, with an activity normally only associated with catalysts utilising higher unit cell size materials, eg 24.53 Å or more. Furthermore this and other properties of the product are often improved over that provided by conventional such higher unit cell size materals.

The present invention further provides a process for the preparation of a zeolite of the present invention, which comprises a) providing a starting zeolite of the faujasite structure having a silica to alumina ratio of from 4.5 to 6.5 and an alkali level of less than 1.5% wt;

b) hydrothermally treating said starting zeolite at a temperature in the range of from 550 to 850° C. and at a partial pressure of steam in the range of from 0 to 100 vol %, basis total gas present, for a time effective to produce a intermediate zeolite having a unit cell size of from 24.35 to 24.50Å;

c) contacting the intermediate zeolite with an acidified solution comprising an acid and optionally an ammonium salt under conditions effective to produce a zeolite having a unit cell size in the range of from 24.40 nm to 24.50 nm; a bulk silica to alumina ratio (SAR) in the range of from 5 to 10; and an alkali metal content of less than 0.15 wt %; and d) recovering said zeolite.

Additionally provided is a naphtha-selective hydrocracking catalyst composition which comprises said zeolite, a binder, and optionally a metal hydrogenation component, and also a process for converting a hydrocarbonaceous feedstock into lower boiling materials, which comprises contacting the feedstock at elevated temperature and pressure with the catalyst composition.

Detailed Description of the Invention

The zeolite of the present invention has advantageous properties when used as a naphtha-selective hydrocracking catalyst.

The unit cell size of the faujasite zeolite, preferably being a zeolite Y, is in the range of from 24.40 to 24.50 Å preferably from 24.42, especially from 24.44, to 24.50 Å More preferably the unit cell size is from 24.44 to 24.48 Å. The bulk silica to alumina molar ratio (herein also termed "SAR") of the zeolite is in the range of from 5 to 10, preferably from 7.5 to 9.0. The surface area of the zeolite is preferably in the range of from 650 to 900 $m^2/g$, most preferably 750 to 875, especially to 850 $m^2/g$. The surface area of a zeolite is an indication of the available or active surface area in the pores of the material and also of the crystalline nature of the zeolite.

The zeolite also preferably has an alkali level of less than 0.1% wt based on the zeolite. The zeolite desirably has as low an alkali level as possible. While certain of the zeolites may have no alkali remaining in their structure, by current analytical techniques this cannot be detected. Certain zeolites of the invention therefore may have no detectable alkali level.

The silica to alumina molar ratio of the faujasite zeolite of the invention is the bulk or overall ratio. This can be determined by any one of a number of chemical analysis techniques. Such techniques include X-ray fluoresence, atomic adsorption, and ICP (inductive coupled plasma). All will provide substantially the same bulk ratio value.

The unit cell size for a faujasite zeolite is a common property and is assessable to an accuracy of ±0.01 Å by standard techniques. The most common measurement technique is by X-ray diffraction (XRD) following the method of ASTM D3942-80.

Surface area is determined in accordance with the well known BET (Brunauer-Emmett-Teller) nitrogen adsorption technique, often simply termed the BET method. Herein also the general procedure and guidance of ASTM D4365-95 is followed in the application of the BET method to zeolite Y materials. To ensure a consistent state of the sample to be measured, suitably all samples undergo a pretreatment. Suitably the pretreatment involves heating the sample, for example to a temperature of 400 to 500° C., for a time sufficient to eliminate free water, eg 3 to 5 hours. The nitrogen porosimetry measurements utilised in the surface area (BET) determination, can also be used to determine other properties such as mesopore (pores having a diameter of 2 nm or more) area. For the zeolites of the present invention, the mesopore area is generally in excess of 50 $m^2/g$.

All of the above measurement and determination procedures are well known to those skilled in the art.

The zeolites of the present invention are suitably prepared by the preparation process described herein which combines a low temperature high steam partial pressure steaming of a low SAR, low alkali oxide, faujasite zeolite, with a subsequent moderate acid dealumination.

The low alkali level starting material may be prepared by techniques well known in the art, for example by re-iterative ammonium ion exchange of higher alkali metal containing zeolite until the desired alkali metal level is achieved, such as is described in U.S. Pat. No. 4,085,069, or via the potassium ion exchange technique disclosed in U.S. Pat. No. 5,435,987 and International Patent Specification No. WO 95/03248. The starting zeolites most suitably have a unit cell size in the range of from 24.60 to 24.74 Å.

While an important aspect of the starting zeolites is the low alkali level, a more critical aspect of the starting zeolites is believed to be their SAR, which is preferably in the range of from 5.4 to 6.5.

Regarding the term alkali and alkali metal, both are used herein interchangeably. Both terms are generally used to indicate alkali metal oxide, for example sodium oxide and/or potassium oxide. The amount is easily determined by, for example, XRF—a quick chemical analysis technique. Most suitably about 1 wt % or less alkali oxide is present in the starting zeolite.

Step b) is a steam calcination step. Such treatments are common in the art and may alternatively be called hydrothermal treatments. Both terms may be used in this text. Both cover heating in the presence of steam. The steam may solely derive from the zeolite itself (so called self-steaming) but in the present step b) externally supplied steam is preferred to ensure consistency of the reaction conditions for the entire duration of the calcination step. To prepare zeolites of use in the present invention, it is useful for the steam calcination to be carried out at a temperature in the range of from 550 to 800° C., and preferably from 600 to 700° C., more preferably 600 to 650° C. The steaming is most usefully carried out for in the range of from 0.5 hours to 5 hours, preferably from 0.5 to 3 hours.

The steam partial pressure for step b) is to be in the range of from 0% vol steam to 100% vol steam, basis total gas present. This can equally be written as being in the range of from 0 to 1 atmosphere. Thus the steam may be generated solely by the internal moisture from the starting zeolite, so-called self-steaming, or, preferably, additional steam is applied. Where the latter is the case, suitably at least 10% vol (0.1 atmosphere), for example at least 15% vol, and most suitably at least 20% vol, steam is supplied. Where another gas is present, this may be air, nitrogen or other inert gas. Useful materials have been prepared utilizing steam conditions in the range of from 90 to 100% vol. Where a lower steam partial pressure is utilised, a longer steam calcination may be necessary to achieve the desired intermediate zeolite.

Whatever heating regime is used, care must be taken to ensure that hot spots do not occur in the treatment vessel as this will yield zeolites of uneven properties.

The nature of the steaming treatment determines the conditions under which the dealumination treatment is carried out. For example, a slightly more severe steaming treatment (eg at a higher temperature) will cause a slightly higher acid requirement to be needed to yield the desired zeolites. The best combination of conditions for the equipment and materials used, can be routinely experimentally determined.

Desirably the SAR of the zeolite changes little in the steaming process but increases during the acid dealumination stage.

Step c) may be carried out at a temperature in the range of from ambient temperature, for example 20° C., to 100° C. Preferably an elevated temperature is used, most suitably in the range of from 40 to 80° C., for example from 60 to 80° C. The temperature used can vary from laboratory scale (where a batch treatment is usual) to the commercial scale (where continuous treatment is normal); in the latter the dealumination time may vary dependent on throughflow of material in the treatment vessel. The dealumination time may be in the range of from 0.5 hours to 10 hours, and is most conveniently from 1 to 5 hours. Naturally the higher the concentration of acid and optional ammonium salt used, the shorter the treatment time. Again the timescale can vary from laboratory scale to commercial scale.

The concentration of acid solution used is critical to achieve the desired materials. The most useful materials are prepared using an acid dosage in the range of from 0.03 to 0.2, preferably from 0.03 to 0.1, for example around 0.05, g HCl per g of zeolite. If a different acid than HCl is used then the appropriate acid equivalent amount can readily be calculated—this presents no problem to the skilled person.

The concentration of ammonium salt, when used, is not critical. Useful materials may be prepared for example using a dosage of from about 4 to about 40 milliequivalents $NH_4^+$ per g of zeolite. The most useful materials have been prepared when using from about 4 to about 20 milliequivalents $NH_4^+$ per g of zeolite.

It is possible to perform either a single step or a multi-step dealumination in order to preserve the crystallinity of the zeolite treated but also to ensure, where necessary, that a mild acid treatment is performed in each step. Most conveniently each step is carried out using the same dealuminant materials and under the same reaction conditions.

Acids that may be used in step c) are inorganic acids or organic acids, for example acetic, formic or oxalic acids. Preferred acids are inorganic or mineral acids having a pKa below 0—often termed 'strong acids' in the art. Non-limiting examples of inorganic acids that can be used in the process of the invention are hydrochloric acid, nitric acid and sulphuric acid. Preferably a monovalent acid such as hydrochloric acid and nitric acid is used. Usefully the acid is used in the form of an aqueous solution.

Generally any ammonium salt may conveniently be used, suitable examples are ammonium nitrate, ammonium chloride, and ammonium sulphate. Preferably the ammonium salt used is selected from ammonium chloride and ammonium nitrate.

In a catalyst of the present invention, the zeolite component is mixed with an amorphous binder component. The amorphous binder component may be any refractory inorganic oxide or mixture of oxides conventional for such compositions. Generally this is an alumina, a silica, a silica-alumina or a mixture of two or more thereof. However it is also possible to use zirconia, clays, aluminium phosphate, magnesia, titania, silica-zirconia and silica-boria, though these are not often used in the art. The amount of zeolite in the catalyst when binder is also present may be up to 90% by weight, but is preferably in the range of from 2, more preferably 20, especially 50, to 80% by weight, based on the total catalyst.

It should be noted that amorphous silica alumina may act both as a second cracking component and as a binder. As a cracking component it is most usefully employed in high operating temperature processes; as a binder it has been found useful in protecting a zeolite from loss of crystallinity, and therefore deactivation, in use in any process that water and/or fluoride is present or generated.

Amorphous silica alumina materials may usefully contain silica in an amount in the range of from 25 to 95 wt %, most preferably at least 40 wt %. Most preferred, however, as a binder is alumina, particularly boehmite, pseudoboehmite, and gamma alumina.

In the preparation of the catalyst of the invention, following the mixing of zeolite with binder, an acidic aqueous solution may be added to the mixture after which it is co-mulled, extruded and calcined in conventional manner. Any convenient mono-basic acid may be used for the acidic solution; examples are nitric acid and acetic acid. During extrusion, conventionally extrusion aids are utilized; usual extrusion aids include Methocel and Superfloc.

Extrusion may be effected using any conventional, commercially available extruder. In particular, a screw-type extruding machine may be used to force the mixture through orifices in a die plate to yield catalyst extrudates of the required form, e.g. cylindrical or trilobed. The strands formed on extrusion may then be cut to the appropriate length, for example 1.6, 2.5, 2.8 mm. If desired, the catalyst extrudates may be dried, e.g. at a temperature of from 100 to 300° C. for a period of 10 minutes to 3 hours, prior to calcination.

Calcination is conveniently carried out in air at a temperature in the range of from 300 to 850° C. for a period of from 30 minutes to 4 hours.

At least one hydrogenation component is preferably incorporated into the catalyst of the invention. This addition may occur at any stage during catalyst preparation, using techniques conventional in the art. For example, the hydrogenation component can be added to the zeolite, or a mixture of zeolite and binder, through co-mulling.

It has been found for zeolite Y-containing catalysts in which the zeolite Y has a unit cell size above 24.40 Å, that the temperature of calcination can affect the activity and selectivity of the catalyst. Catalysts calcined at high temperatures can demonstrate an increased activity of as much as 3 to 5° C. (where activity is demonstrated by the temperature required to obtain a specific conversion of feed), and an increased selectivity of 0.5 to 2 wt % for light and heavy naphtha product. This effect is particularly enhanced for catalysts prepared via co-mulling, whether by co-mulling of zeolite and binder only, or of zeolite and binder together with one or more hydrogenation metal salts.

Therefore, preferably the calcination temperature used is in the range of from 600 to 850° C. More preferably, the calcination temperature is in the range of from 650 to 820° C., and it is especially preferred in the range of from 700 to 750° C.

The time taken for the calcination is not usually critical.

Alternatively the hydrogenation component may be added to the formed extrudates either before or after calcining, using conventional impregnation techniques, eg as one or more aqueous impregnating solutions of Group VIB and/or Group VIII metal salts. If the impregnation occurs after calcination of the formed extrudates, then a further drying and calcination procedure is usefully employed.

Suitable metals salts for both co-mulling and impregnation preparation routes are acetates, carbonates, nitrates and ammonium salts, such as nickel acetate, nickel nitrate, nickel carbonate, and ammonium metatungstate, as are well known to those skilled in the art. For environmental reasons nitrate and carbonate salt solutions are preferred over the use of acetate solutions.

Herein reference is made to the Periodic Table of Elements which appears on the inside cover of the CRC Handbook of Chemistry and Physics ('The Rubber Handbook'), 66$^{th}$ edition and using the CAS version notation.

Suitably the hydrogenation component is selected from nickel, cobalt, molybdenum, tungsten, platinum and palladium.

Examples of hydrogenation components that may thus suitably be used include Group VIB (e.g. molybdenum and tungsten) and Group VIII metals (e.g. cobalt, nickel, iridium, platinum and palladium), their oxides and sulphides. The catalyst composition will preferably contain at least two hydrogenation components, e.g. a molybdenum and/or tungsten component in combination with a cobalt and/or nickel component. Particularly preferred combinations are nickel/tungsten and nickel/molybdenum. Very advantageous results are obtained when these metal combinations are used in the sulphide form.

The present catalyst composition may contain up to 50 parts by weight of hydrogenation component, calculated as metal per 100 parts by weight (dry weight) of total catalyst composition. For example, the catalyst composition may contain from 2 to 40, more preferably from 5 to 30, especially 5 to 10 parts by weight of Group VIB metal(s) and/or from 0.05 to 10, more preferably from 0.5 to 8 and advantageously from 1 to 5, parts by weight of Group VIII metal(s), calculated as metal per 100 parts by weight (dry weight) of total catalyst composition.

Typical properties for a catalyst of the invention include a water pore volume in the range of from 0.6 to 0.75 cc/g, preferably in the range of from 0.65 to 0.7, and a flat plate (FP) crush strength of in excess of 3.5 lb/mm, suitably at least 4, preferably at least 5, more preferably in the range of from 5 to 7, especially from 6 to 7. Typical catalysts may have an average particle length of from 4 to 6 nm. Typically also a catalyst of the present invention has a compacted bulk density (CBD) of at least 0.50 g/cc, preferably at least 0.55, more preferably at least 0.58; at most the CBD is suitably 0.65 g/cc, more suitably 0.60 g/cc. Herein CBD is assessed following the method of ASTM D 4180-03 except that a tamper is placed on the top of the test sample within a 250 ml graduated cylinder placed firmly on a vibrating table, and the sample is assessed without predrying and a correction for dry weight is made separately according to the formula $$CBD = \text{measured } CBD \times (100 - LOI)/100$$

LOI is the relative amount of lost mass upon heating the material, ie the water content. Here this is determined herein by heating the material to 485° C. under the following procedure: a sample is mixed well to prevent any inhomogeneity. The weighed sample is transferred into a weighed and pre-calcined crucible. The crucible is place to a preheated oven at 485° C. for a minimum time of 15 minutes, but typically for 1 hour. The crucible containing the dried sample is weighed again, and the LOI is determined according to the formula:

$$LOI \% = (w - w_{calc})/w \times 100\%$$

where $w$ is the original weight of the sample, and $w_{calc}$ is the weight of the calcined sample after heating in the oven, both corrected with the weight of the crucible.

The catalyst composition finds especial application as a naphtha-selective catalyst composition. Thus, the present invention also provides a process for converting a hydrocarbonaceous feedstock into lower boiling materials which comprises contacting the feedstock with hydrogen at elevated temperature and elevated pressure in the presence of a catalyst composition according to the present invention.

Examples of such processes comprise single-stage hydrocracking, two-stage hydrocracking, and series-flow hydrocracking. Definitions of these processes can be found in pages 602 and 603 of Chapter 15 (entitled "Hydrocarbon processing with zeolites") of "Introduction to zeolite science and practice" edited by van Bekkum, Flanigen, Jansen; published by Elsevier, 1991.

It will be appreciated that the hydroconversion processes of the present invention can be carried out in any reaction vessel usual in the art. Thus the process may be performed in a fixed bed or moving bed reactor. Also the catalyst of the invention may be used in conjunction with any suitable co-catalyst or other materials usual in the art. Thus for example the catalyst of the invention may be used in stacked bed formation with one or more other catalysts useful in hydroprocessing, for example with a catalyst containing a different zeolite, with a catalyst containing a faujasite zeolite of different unit cell size, most preferably a unit cell size of greater than 24.50 Å, with a catalyst utilizing an amorphous carrier, and so on. Various stacked bed combinations have been proposed in the literature: WO-99/32582; EP-A-310,164; EP-A-310,165; and EP-A-428,224 may, for example, be mentioned.

The hydrocarbonaceous feedstocks useful in the present process can vary within a wide boiling range. They include atmospheric gas oils, coker gas oils, vacuum gas oils, deasphalted oils, waxes obtained from a Fischer-Tropsch synthesis process, long and short residues, catalytically cracked cycle oils, thermally or catalytically cracked gas oils, and syncrudes, optionally originating from tar sand, shale oils, residue upgrading processes and biomass. Combinations of various hydrocarbon oils may also be employed. Typically, though, the feedstocks most suited for the process of the invention are the lighter feedstocks or fractions obtained by treatment of a feedstock through cracking or fractionation. Such feedstocks include atmospheric and vacuum gas oils, gas oils formed by cracking processes, cycle oils, and similar boiling range feedstocks. The boiling range will generally be of the order of from about 90 to 650° C. The feedstock may have a nitrogen content of up to 5000 ppmw (parts per million by weight) and a sulphur content of up to 6 wt %. Typically, nitrogen contents are in the range from 10, eg from 100, to 4000 ppmw, and sulphur contents are in the range from 0.01, eg from 2, to 5 wt %. It is possible and may sometimes be desirable to subject part or all of the feedstock to a pretreatment, for example, hydrodenitrogenation, hydrodesulphurisation or hydrodemetallisation, methods for which are known in the art.

The process of the invention may conveniently be carried out at a reaction temperature in the range of from 250 to 500° C.

The present process is preferably carried out at a total pressure (at the reactor inlet) in the range of from $3\times10^6$ to $3\times10^7$ Pa, more preferably from $8\times10^6$ to $2.0\times10^7$ Pa. Where a hydrocracking process is carried out at a low pressure of, for example, up to $1.2\times10^7$ Pa this may be termed 'mild hydrocracking'.

The hydrogen partial pressure (at the reactor inlet) is preferably in the range from $3\times10^6$ to $2.9\times10^7$ Pa, more preferably from $8\times10^6$ to $1.75\times10^7$ Pa.

A space velocity in the range from 0.1 to 10 kg feedstock per litre catalyst per hour ($kg.l^{-1}.h^{-1}$) is conveniently used. Preferably the space velocity is in the range from 0.1 to 8, particularly from 0.2 to 5 $kg.l^{-1}.h^{-1}$.

The ratio of hydrogen gas to feedstock (total gas rate) used in the present process will generally be in the range from 100 to 5000 Nl/kg, but is preferably in the range from 200 to 3000 Nl/kg.

The present invention will now be illustrated by the following Examples.

EXAMPLES

In the Examples the following test methods have been used:

Unit Cell Size: Determined by X-ray diffraction using the method of ASTM D-3942-80.

Surface Area: Determined in accordance with the conventional BET (Brunauer-Emmett-Teller) method nitrogen adsorption technique as described in the literature at S. Brunauer, P. Emmett and E. Teller, J. Am. Chm. Soc., 60, 309 (1938), and ASTM method D4365-95. In the determinations quoted below, the results are given as a single point assessment taken at a nitrogen partial pressure of 0.03 following a high temperature pretreatment.

Silica To Alumina Molar Ratio (SAR): Determined by chemical analysis; values quoted are 'bulk' SAR (that is to say the overall SAR) and not specifically the SAR of the crystalline framework.

Example 1

Zeolite Preparation

Faujasite zeolite of SAR 5.6, unit cell size 24.64 Å, 12.40 wt % sodium oxide, ex-Zeolyst International, was converted into a low alkali (less than 1.5 wt % alkali oxide) ammonium form Y zeolite using the technique described in U.S. Pat. No. 5,435,987 which involves $K^+$ ion exchange of the sodium form zeolite Y, followed by ammonium ion exchange. The resulting zeolite was of unit cell size 24.70 Å, SAR 5.6, potassium oxide content 0.45 wt %, and sodium oxide content 0.35 wt %.

This low alkali ammonium form zeolite Y was then steam calcined for 45 minutes at a temperature of 630° C. in 100 vol % steam in a rotary kiln to provide a zeolite having a unit cell size 24.42 Å and SAR of 5.6. The steamed zeolite was then subjected to an acid-dealumination treatment as a one-step treatment with an aqueous solution of hydrochloric acid in an amount of 0.05 g HCl/g zeolite for at least 1 hour at 60° C.

The final zeolite was of unit cell size 24.46 Å, SAR 8.1, alkali content 0.08 wt % and a surface area of 810 $m^2/g$.

Example 2

Catalyst Preparation

The zeolite Y prepared in Example 1 was loaded into a muller at low speed and mixed with a metals solution for five minutes following which alumina (HMPA alumina ex Criterion Catalysts & Technologies) in an amount sufficient to provide a weight ratio of zeolite to alumina, dry basis, of 80:20, and Methocel K-15MS in an amount of 1.8 wt % basis total dry solids, was added and the whole mixed at high speed for 1 to 2 minutes. The metals solution was an aqueous solution of a nickel nitrate solution (14.4 wt % nickel) and an ammonium metatungstate solution (73 wt % tungsten); the overall metals solution contained 6.3 wt % nickel and 20.5 wt % tungsten and had a pH in the range of 2.0 to 2.4.

Deionised water to achieve a loss on ignition in the product of 50% and nitric acid (2 wt % total dry solids) to peptise the alumina was then added and mixing continued at high speed until the colour of the mix changed to a darker green and large lumps appeared in the mix from agglomeration of the materials. Superfloc, in an amount of 1.0 wt %, basis total dry solids, was then added and the whole mixed for a further 3 to 5 minutes until an extrudable mix was formed. The mix was then extruded in a screw extruder into extrudates having, in cross section, a tri-lobe shape. The extrudates were dried in a rotating drum at a temperature not exceeding 130° C. for about 90 minutes, and then calcined at 730° C. for about 2 hours.

The final catalyst had the following composition: 3.3 wt % as nickel oxide (2.6 wt % nickel); 10.6 wt % as tungsten oxide (8.4 wt % tungsten); 68.9 wt % zeolite Y; and 17.2 wt % alumina binder, all basis total catalyst.

Example 3

Activity Testing

The hydrocracking performance of a catalyst prepared according to the same procedure as detailed in Example 2, except that the extrudates were formed into 1.6 mm cylinders, and utilising a zeolite of the type of Example 1, was assessed alongside comparison catalysts in a number of second stage series-flow simulation tests. The testing was carried out in once-through microflow equipment which had been loaded with a catalyst bed comprising 15 ml of the test catalyst diluted with 15 ml of 0.1 mm SiC particles. The catalyst bed was presulphided prior to testing.

Each test involved the sequential contact of a hydrocarbonaceous feedstock with the catalyst bed in a once-through operation under the following process conditions: a space velocity of 1.3 kg feed oil per 1 catalyst per hour (kg.$1^{-1}$.h$^{-1}$), a hydrogen gas/feed oil ratio of 1000 Nl/kg, and a total pressure of 9,600 kPa (96 bar) at the inlet.

The test feedstock used had the following properties:

| | |
|---|---|
| Carbon content | 87.03 wt % |
| Hydrogen content | 12.95 wt % |
| Sulphur content | 0.024 wt % |
| Nitrogen (N) content | 13 ppmw |
| Added n-Decylamine | 0.91 g/kg |
| (to achieve 150 ppmv NH$_3$) | |
| Added sulphur Sulfrzol54 | 6.21 g/kg |
| (to achieve 2500 ppmv H$_2$S) | |
| Density (15/4° C.) | 0.8719 g/ml |
| Initial boiling point | 162° C. |
| 50% w boiling point | 308° C. |
| Final boiling point | 533° C. |
| Fraction boiling below 370° C. | 18.40 wt % |
| Fraction boiling below 191° C. | 3.13 wt % |

Hydrocracking performance was assessed at conversion levels from 65 to 92 wt % net conversion of feed components boiling above 191° C. Hydrocracking activity, was assessed as the temperature required to obtain 75% wt net conversion of feed components boiling above 191° C.

The results are shown in Table 1 below. The comparison catalysts were prepared utilising zeolite Y materials (ex-Zeolyst International) of different unit cell size in excess of 25.50 Å but otherwise of similar physical properties to the zeolite of Example 1. For the test catalyst and for the comparison catalysts, the same catalyst preparation method, metals loading, and zeolite/binder contents were followed, and all catalysts were tested and assessed by the same procedure as mentioned above. The hydrogen consumption in all cases was approximately 2.2 wt %.

From the results it can be seen that normally a decrease in unit cell size leads to a decrease in activity (cf the increase in T req. from Comp. A to Comp. B) and a decreasing naphtha yield. The catalyst of the present invention with a much lower unit cell size however exhibits an activity and selectivity even better than Comp. A and in comparison also yields a surprisingly higher iC4/nC4 ratio.

TABLE 1

| Catalyst | Unit[1] cell size (Å) | SAR[1] | Surface[1] area (m$^2$/g) | T req. (° C.) | C1-C4 (wt %) | C5-82° C. (wt % w) | 82-191° C. (wt %) | Total naphtha | iC4/nC4 |
|---|---|---|---|---|---|---|---|---|---|
| Comp. A | 24.55 | 7.2 | 800 | 362.1 | 11.6 | 20.3 | 46.1 | 66.4 | 2.03 |
| Comp. B | 24.51 | 8.2 | 811 | 362.8 | 12.2 | 21.2 | 44.6 | 65.8 | 1.97 |
| Cat. of Example 2 | 24.46 | 8.1 | 810 | 361.7 | 10.9 | 20.3 | 46.9 | 67.2 | 2.12 |

[1]properties of the zeolite

Example 4

Zeolite Preparation

A zeolite Y sample was prepared following the procedure of Example 1 (but on a tonne scale) from a faujasite zeolite starting material of SAR 5.2, unit cell size 24.64 Å, 12.99 wt % sodium oxide, ex-Zeolyst International.

The amount of acid used in the final, dealumination step was adjusted to obtain a SAR of 8.25 in the final material.

The final zeolite was of unit cell size 24.50 Å, SAR 8.25, alkali content 0.06 wt % and a surface area of 865 m$^2$/g.

Example 5

Catalyst Preparation

The zeolite Y prepared in Example 4 was formulated into a catalyst, shaped as described in Example 2, by following the same procedures.

The final catalyst had the following composition: 3.3 wt % as nickel oxide; 10.6 wt % as tungsten oxide; 68.9 wt % zeolite Y; and 17.2 wt % alumina binder.

Example 6

Zeolite Preparation

A zeolite Y sample was prepared following the procedure of the Example 1 (but on a tonne scale) from identical starting material to that of Example 4. The amount of acid used in the last dealumination step was adjusted to reach a higher SAR value in the resulting material.

The final zeolite was of unit cell size 24.48 Å, SAR 9.9, alkali content 0.04 wt % and surface area of 897 m²/g.

Example 7

Catalyst Preparation

The zeolite Y prepared in Example 6 was formulated into a catalyst, shaped as described in Example 2, by following the same procedures.

The final catalyst had the following composition: 3.3 wt % as nickel oxide; 10.6 wt % as tungsten oxide; 68.9 wt % zeolite Y; and 17.2 wt % alumina binder.

Example 8

Activity Testing

Utilising the same test procedures and conditions as detailed in Example 3, the hydrocracking performance of the catalysts prepared as in Examples 5 and 7, but again with the extrudates formed into 1.6 mm cylinders, was assessed.

The results are given in Table 2 below, together with those for the catalyst of Example 2.

TABLE 2

| Catalyst | Unit[1] cell size (Å) | SAR[1] | Surface[1] area (m²/g) | T req. (° C.) | C1-C4 (wt %) | C5-82° C. (wt % w) | 82-191° C. (wt %) | Total naphtha | iC4/nC4 |
|---|---|---|---|---|---|---|---|---|---|
| Example 2 | 24.46 | 8.1 | 810 | 361.7 | 10.9 | 20.3 | 46.9 | 67.2 | 2.12 |
| Example 4 | 24.50 | 8.25 | 865 | 363.5 | 10.3 | 20.1 | 47.7 | 67.8 | 2.04 |
| Example 6 | 24.48 | 9.9 | 897 | 363.1 | 11.4 | 22.3 | 44.6 | 66.9 | 2.05 |

[1]properties of the zeolite

From the results, it can be seen that the trend for this type of zeolite Y is that an increase in surface area has not improved the activity, contrary to the effect found for the lower unit cell size faujasite materials of WO 04/047988.

It can also be seen that increasing the SAR in the zeolite, whilst staying at or just below 24.50 Å unit cell size (cf Example 4 and Example 6 in the table) increases the selectivity to light naphtha products (the liquid fraction boiling below 82° C.) so that while the heavy naphtha yield is reduced, the total naphtha yield has hardly changed. However, the iC4/nC4 ratio has reduced.

That which is claimed is:

1. A process for the preparation of a zeolite, useful as a component of a naphtha-selective hydrocracking catalyst composition, wherein said process comprises:
   a) providing a starting zeolite of the faujasite structure having a silica to alumina ratio of from 4.5 to 6.5 and an alkali level of less than 1.5% wt;
   b) hydrothermally treating said starting zeolite at a temperature in the range of from 550 to 850° C. and at a partial pressure of steam in the range of from 0 to 100 vol %, basis total gas present, for a time effective to produce a intermediate zeolite having a unit cell size of from 24.35 to 24.50 Å;
   c) contacting the intermediate zeolite with an acidified solution comprising an acid under conditions effective to produce a zeolite having a unit cell size in the range of from 24.40 Å to 24.50 Å; a bulk silica to alumina ratio (SAR) in the range of from 7.5 to 9.0; and an alkali metal content of less than 0.15 wt %; and
   d) recovering said zeolite.

2. A process as claimed in claim 1, wherein, in step (a), the starting zeolite has a silica to alumina ratio in the range of from 5.4 to 6.5.

3. A process as claimed in claim 2, wherein, in step b), the calcination temperature is in the range of from 600 to 650° C., and the steam partial pressure is at least 20 vol %.

4. A process as claimed in claim 3, wherein the amount of acidified solution is sufficient to provide an acid to zeolite ratio in the range of from 0.03 to 0.2 g HCl, or acid equivalent, per g of zeolite.

5. A composition prepared by any one of the processes of claims 1-4.

6. A process as recited in any one of claims 1-4, wherein said zeolite has an alkali metal content of less than 0.1 wt % based on the zeolite.

7. A process as recited in any one of claims 1-4, wherein said zeolite has a surface area in the range of from 750 to 875 m²/g.

8. A process as recited in any one of claims 1-4, wherein said zeolite has a unit cell size in the range of from 24.42 to 24.50 Å.

9. A process as recited in any one of claims 1-4, wherein said zeolite has a unit cell size in the range of from 24.44 to 24.48 Å.

10. A naphtha-selective hydrocracking catalyst composition, which comprises a zeolite, a binder, and a metal hydrogenation component wherein said zeolite is of the faujasite structure which has a unit cell size in the range of from 24.40 to 24.50 Å; a bulk silica to alumina ratio (SAR) in the range of from 7.5 to 9.0; and an alkali metal content of less than 0.15 wt %.

11. A process for converting a hydrocarbonaceous feedstock into lower boiling materials, which comprises contacting the hydrocarbonaceous feedstock at elevated temperature and pressure with a catalyst composition as claimed in claim 10.

12. A naphtha-selective hydrocracking catalyst composition as claimed in claim 10, wherein said zeolite has a surface area in the range of 650-900 m²/g.

13. A naphtha-selective hydrocracking catalyst composition as claimed in claim 10 or claim 12, wherein said unit cell size is in the range of from 24.44 to 24.48 Å.

14. A catalyst composition useful as a naphtha-selective hydrocracking catalyst, wherein said catalyst composition comprises: a zeolite of the faujasite structure that is present in said catalyst composition in the range of from 2 to 80% by weight, based on the total catalyst composition, and having a unit cell size in the range of from 24.40 to 24.50 Å and a bulk silica to alumina ratio (SAR) in the range of from 5 to 10; and an amorphous binder component, wherein said zeolite has an alkali metal content of less than 0.15 wt % based on the zeolite, and wherein said zeolite has a surface area in the range of from 650 to 900 m²/g; and at least one hydrogenation component, wherein said at least one hydrogenation component is a metal compound of metals selected from Group VIB metals and Group VIII metals, wherein said catalyst composition contains from 2 to 40 parts by weight Group VTB metal(s), calculated as metal per 100 parts by weight of the total catalyst composition, and from 0.05 to 10 parts by weight Group VIII metal(s), calculated as metal per 100 parts by weight of the total catalyst composition, wherein the unit cell size of said zeolite is in the range of from 24.44 to 24.48.

15. A catalyst composition as recited in claim 14, wherein the SAR of said zeolite is in the range of from 7.5 to 9.0.

16. A catalyst composition as recited in any one of claims 14-15, wherein said zeolite has a surface area in the range of from 750 to 875 m2/g.

17. A catalyst composition as recited in any one of claims 14-16, wherein said zeolite is present in said catalyst composition in the range of from 50 to 80% by weight.

18. A process for converting a hydrocarbonaceous feedstock into lower boiling materials, which comprises: contacting the hydrocarbonaceous feedstock at elevated temperature and pressure with the catalyst composition of claim 14.

19. A process for converting a hydrocarbonaceous feedstock into lower boiling materials, which comprises: contacting the hydrocarbonaceous feedstock at elevated temperature and pressure with the catalyst composition of claim 15.

20. A process for converting a hydrocarbonaceous feedstock into lower boiling materials, which comprises: contacting the hydrocarbonaceous feedstock at elevated temperature and pressure with the catalyst composition of claim 16.

21. A process for converting a hydrocarbonaceous feedstock into lower boiling materials, which comprises: contacting the hydrocarbonaceous feedstock at elevated temperature and pressure with the catalyst composition of claim 17.

* * * * *